United States Patent [19]
Belcak et al.

[11] 3,954,648
[45] May 4, 1976

[54] COATINGS REMOVAL COMPOSITION CONTAINING AN ALKALI METAL HYDROXIDE, AN OXYGENATED ORGANIC SOLVENT, AND AN AMINE

[75] Inventors: Edward John Belcak, King of Prussia; Leo Francis Corcoran, Audubon, both of Pa.

[73] Assignee: Pennwalt Corporation, Philadelphia, Pa.

[22] Filed: Feb. 5, 1973

[21] Appl. No.: 329,503

Related U.S. Application Data

[63] Continuation-in-part of Ser. No. 887,422, Dec. 22, 1969, abandoned.

[52] U.S. Cl. .................... 252/158; 134/38; 252/153; 252/170; 252/171
[51] Int. Cl.² ........................................ C11D 7/06
[58] Field of Search .............. 134/38; 252/158, 153, 252/170, 171, DIG. 8

[56] References Cited
UNITED STATES PATENTS

| | | | |
|---|---|---|---|
| 1,113,971 | 10/1914 | Ellis | 252/DIG. 8 |
| 1,167,641 | 1/1916 | Ellis | 252/DIG. 8 |
| 2,445,064 | 7/1948 | Hall et al. | 252/DIG. 8 |
| 2,479,628 | 8/1949 | Kuentzel | 252/DIG. 8 |
| 2,662,837 | 12/1953 | Duncan | 134/38 X |
| 2,710,843 | 6/1955 | Stedleton | 134/38 X |
| 2,750,343 | 6/1956 | Beber | 252/DIG. 8 |
| 2,755,209 | 7/1956 | Duncan | 134/38 X |
| 2,898,246 | 8/1959 | Hannah | 252/DIG. 8 |
| 2,940,877 | 6/1960 | Jaffe et al. | 252/DIG. 8 |
| 2,992,995 | 7/1961 | Arden | 252/158 |
| 2,992,997 | 7/1961 | Arden et al. | 252/158 |
| 3,058,918 | 10/1962 | Gatza | 252/DIG. 8 |
| 3,216,945 | 11/1965 | Mankowich | 252/DIG. 8 |

*Primary Examiner*—Benjamin R. Padgett
*Assistant Examiner*—B. Hunt
*Attorney, Agent, or Firm*—Robert G. Danehower

[57] ABSTRACT

This invention relates to liquid compositions and methods of using them for removing coatings from coated metal surfaces, particularly metals, and especially those metals subject to attack by corrosive liquids. The compositions comprise from one-fourth to about 10% by weight of alkali metal hydroxide, from 40 to about 60% by weight of at least one liquid high boiling oxygenated solvent, and from 40 to about 60% by weight of at least one liquid high boiling amine. Optionally, the compositions may contain from one-half to about 20% by weight of a surface active or wetting agent.

The method of use comprises applying the anhydrous liquid composition to the coated object at a temperature from ambient up to the boiling point of the composition for a time sufficient to loosen or remove the coating.

20 Claims, No Drawings

COATINGS REMOVAL COMPOSITION CONTAINING AN ALKALI METAL HYDROXIDE, AN OXYGENATED ORGANIC SOLVENT, AND AN AMINE

This application is a continuation-in-part application of Ser. No. 887,422, now abandoned, filed Dec. 22, 1969.

BACKGROUND OF THE INVENTION.

This invention broadly relates to coating stripping compositions and methods of removing coatings from surfaces, particularly metals which are subject to corrosion. More specially, the invention relates to removing enamels, acrylic lacquers, zinc chromate primers, epoxy coatings and polyurethane coatings from metals such as aluminum, magnesium, titanium and steel.

In the prior art the methods of removing such compositions from the listed metals have generally involved the use of corrosive materials such as nitric acid, sulfuric acid, chromic acid and hydrofluoric acid and aqueous alkaline solutions. It is apparent that these materials are not only difficult to handle but tend to corrode and deteriorate metals. Therefore, the removal of difficult to remove coatings from metals has formed a particularly difficlt problem for the art. Other paint and resin stripping compositions have relied on various combinations of organic solvents with or without the use of water and with or without alkali metal hydroxides. Patents relating to such stripping compositions and processes are Nos. 2,662,837, 2,710,843, 2,755,209, 2,898,246, 2,940,877, 2,992,995, 3,058,918, 3,216,945, 3,321,407, 3,324,039, 3,322,677, and 3,417,025. These compositions and processes have not been completely satisfactory.

This invention avoids these problems and provides a non-corrosive anhydrous stripping compositions adapted for use in removing coatings such as enamels, acrylics, epoxy, zinc chromate primers, epoxy-polyamide coatings and polylurethane coatings from metals.

SUMMARY OF THE INVENTION

The compositions and processes of our invention are especially useful in removing paint, resin and polymer coatings from coated surfaces, especially metals without corroding the surfaces. The compositions and processes are particularly suited for removing coatings from metals such as aluminum, magnesium and titanium which have been vulnerable to corrosion by many of the prior art compositions. The compositions and processes are also applicable to steel surfaces.

The compositions of our invention are in the form of liquid solutions or dispersions. The compositions are also anhydrous. By anhydrous is meant that there is less than 1% by weight of water present in the compositions.

The compositions of our invention comprise mixtures of at least one member from each of three chemical groups. In addition, each chemical group is present in the compositions within specified weight percentage ranges. The chemical groups and their weight percentage ranges are:

Alkali metal hydroxides — one-fourth to about 10 %, liquid high boiling amine — 40 to about 60%, and liquid high boiling oxygen containing organic solvent — 40 to about 60%.

The alkali metal hydroxides are preferably the sodium, potassium, lithium, etc. hydroxides which may be used alone or in combination in weight quantities of one-fourth to about 10% by weight of the total mixture. These hydroxides can be added in flake or any dry form.

The liquid high boiling amines which are useful in this invention are those having a high boiling point, that is, a boiling point above about 65°C. and preferably above about 100°C. Amines having a boiling point under 100°C. and especially under 65°C. have too high a flash point or are too volatile for satisfactory and safe use in our compositions and processes. The use of the term liquid defines those amines which are liquid at ambient temperature.

Among the liquid high boiling amines which are useful in our compositions and processes are the following 1. Lower alkanol amines and alkanol polyamines such as 2-hydroxypropyl (ethylene diamine), 2-hydroxyethyl (ethylene diamine), tetraethanol propylene diamine, pentaethanol diethylene triamine, hexaethanol triethylene tetramine, triethanol amine, $N,N,N^1N^1$-tetrakis-(2-propano)-ethylene diamine, monoethanolamine, dimethylaminoethanol, ethylaminoethanol, diethylaminoethanol, diisopropylaminoethanol, and dibutylaminoethanol. One preferred amine is triethanolamine and especially preferred are the mono, di and tri lower alkylolamines with 2 to 12 carbon atoms.

2. Alkylamines — the lower alkyl amines, such as methyl- and ethylamines are effective, but because of their low boiling point and high volatility they are less well adapted to this process than the higher alkylamines such as dibutylamine, diamylamine, octylamine, and the like, which are not driven off so easily under elevated temperature conditions. Other suitable alkylamines are triethylene tetramine, dipropylamine, tri-n-butylamine, triamylamine, n-hexylamine, di-n-hexylamine and tri-n-hexylamine.

3. Arylamines - benzylamine and benzyldiethanolamine have been found to be very effective for the purpose of this invention, particularly compounds such as aniline, p-toluidine, dimethyl aniline, diethyl aniline, benzyl diethylamine or the like.

4. Cycle tertiary amines — amines of this nature have been found to be quite suitable for use in accordance with this invention. Examples are 2,4-lutidine, 2,5-lutidine, 3,5-lutidine, pyridine, hexyl pyridine, quinoline, N-vinyl-2-pyrolidine, N-methyl-2-pyrole, collidine, piperidine, 1-butyl piperidine, 1-propyl piperidine, pyrrolidine and pyrrole.

5. Hetero atom compounds containing nitrogen — examples of this type of amine compound are hydroxyethyl piperazine, morpholine, 4 ethyl morpholine, N-aminopropyl morpholine, and pyrrolidone.

The liquid high boiling amines may be used singly or in admixture with other amines and of course in combination with the alkali metal hydroxide and liquid high boiling oxygenated solvent.

The liquid high boiling oxgenated solvents useful in our compositions and processes are selected from the group consisting of alcohols, carbonyls, esters, amides, lactones, tetramethyl urea, diphenyl ether and dimethyl sulfoxide. By liquid is meant those solvents which are liquids at ambient temperature. By high boiling is meant those solvents which have a boiling point in excess of about 100°C. This high boiling excludes those solvents boiling under 100°C. which are too volatile or which have too high a flash point for economical and safe stripping. A single oxygen containing solvent or a mixture of them can be used in our compositions.

1. The liquid high boiling alcohols which are used in our compositions and processes are the liquid high boiling aliphatic and aromatic alcohols and including glycols, polyglycols such as the poly (alkylene) glycols and polyols. Generally these alcohols will fall in the range of $C_4$ to about $C_{100}$ carbon atoms. Examples of suitable alcohols as defined above include triethylene glycol, polyethylene glycol, glycerin, triethylene glycol, polyethylene glycol, lisodecanol, trideconol, methoxy triglycol, ethoxy triglycol, thiodiglycol, ethylene glycol, polypropylene glycol, monoethoxy ethylene glycol, monobutoxy ethylene glycol, adonitol, tetrahydro furfuryl alcohol, cyclohexanol, furfuryl alcohol, 1,5-pentanediol, 1,2,6-hexanetriol, decyl alcohol, isoamyl alcohol, tolylol, cresol, butyl phenol, methyl phenyl carbinol, 1-butanol, 1-pentanol, 1-hexanol, 2-petanol, 2-methyl-1-butanol, 2-methyl pentanol, 4-methyl pentanol, 2-ethyl butanol, 2-ethyl hexanol, iso-octanol, diisobutyl carbinol, 2,6,8-trimethyl-4-nonanol.

Preferred alcohols are the glycols and polyglycols. Triethylene glycol is a preferred species. Other preferred glycols are those diols of the aliphatic (preferably saturated) series with 2–12 carbon atoms.

2. The carbonyls useful in our compositions are the liquid high boiling aldehydes and ketones. As indicated previously, this class of oxygenated solvent as well as all other classes have boiling points in excess of about 100°C. Suitable carbonyls include isodealdehyde, 1-tetralone, tetrahydro benzaldehyde, isophorone, methyl hexyl ketone, 4-methoxy-4-methyl-2-pentone, methyl isoamyl ketone, valeraldehyde, 2-methyl pentaldehyde, 3-methyl butyraldehyde, 2-ethyl butyraldehyde, 2-ethyl hexaldehyde acetophenone, 4-chloro acetophenone, ethyl butyl ketone, hexahydro benzaldehyde, diisobutyl ketone, isobutyl heptyl ketone, mesityl oxide, 2,4-pentanedione diacetone alcohol, 1-tetralone, cyclohexanone.

The carboxylic acids are not suitable solvents in our compositions and processes because they react with the alkali metal hydroxides. However, the ester, amide, lactone and urea derivatives of carboxylic acids are useful in our compositions.

3. The esters which are useful in our compositions and processes are those high boiling esters which are liquid at ambient temperatures. Examples are carbitol acetate, glyceryl triacetate, diethyl maleate, n-butyl phthalate, methyl butyrate, methyl deconoate, n-butyl butyrate, ethyl decanoate, ethyl hydroxy iso-butyrate, propyl decanoate, methyl lactate, methyl octanoate, ethyl lactate, ethyl octanoate, butyl lactate, propyl octanoate, amyl formate, n-propyl acetate, butyl formate, n-butyl acetate, diethyl oxlate, sec-butyl acetate, n-butyl oxalate, isobutyl acetate, di-amyl oxalate, amyl acetate, n-butyl pentanoate, sec-amyl acetate, sec butyl pentanoate, penta acetate, iso-butyl pentanoate, iso-propyl pentanoate, ethyl proprionate, methyl pentanoate, n-butyl proprionate, amyl proprionate, ethyl butyrate.

4. The amides are an unusual class of useful solvents in our compositions and processes since they can be used either as a member of the oxygen containing solvent class or as a member of the amine solvent class. However, two amides should not be used together as members of both classes of oxygenated solvents and amines. Suitable amides are dimethyl formamide, lauric diethanolamide, dimethyl acetamide, n-butyl acetamide, n,n-dipropyl acetamide, n-ethyl acetamide, n-methyl acetamide, n,n-dimethyl butyramide, n-ethyl formamide, n-methyl formamide, n,n-dimethyl pentanamide and tetramethyl urea.

5. The lactones which are useful in our compositions and processes are 4-butyl lactone, gamma valerolactone, delta-valerolactone and 2 ethyl, 4-butyryl lactone.

The compositions may, if desired, comprise a conventional wetting agent in an amoung of one half to about 20% by weight. These materials aid in washing the coating from the coated article and increase the overall solvent action of the compositions of this invention. Suitable wetting or surface active agents are the anionic, cationic and nonionic compositions which are well known in the art.

Examples of suitable nonionics are octyl phenoxy polyethoxy ethanol sold as Triton X-100 (Rohm & Haas Co.), cetyl dimethyl amine oxide sold as Ammonyx CO (Onyx Chemical Co.), polyethylene glycol fatty esters sold as Airodyne 315 (Geigy Industrial Chemicals), fatty alkylol amine condensate sold as Alromine RA (Geigy Industrial Chemicals), alkyl aryl polyglycol ether sold as Basopon LN (BASF Corp.), blend of ethoxylated linear alcohols and amine condensate sold as Biofax 6200 (Charles S. Tanner), detergent combined with potassium dichloro-s-triazinetrione sold as Breakthrough HD (Proctor & Gamble), myristic diethanolamide sold as Condensate M (Continental Chemical Co.), coconut fatty acid amide condensate sold as Drutergent D (Drew Chemical Co.), lauric isoproponolamide sold as Empilan LIS (Albright & Wilson Ltd.), glyceryl monoricinoleate sold as Flexricin 13 (Baker Castor Oil Co.), complex phosphate ester sold as Fosterge NOH (Textilana Corp.), n,n-dimethyl caproamide sold as Hallcomid M-6 (C. P. Hall Co. of Illinois), ethylene oxide condensate sold as Invadline JFC (Ciba Chemical & Dye Co.), ethoxylate castor oil sold as Lipal 9C (Drew Chemical Co.), fatty acid ester sold as Marcanon SX (Maper Color & Chemical Co.), acylated polyamide sold as Nalco 70 (Nalco Chemical Co.), polyethylene glycol (400) monotallate sold as Pegosperce 400-MOT (Glyco Chemicals, Inc.), polyvinyl alcohol resin sold as Resin D-365 (Monsanto Corp.), sorbitan monooleate sold as Sorbitan Monooleate (Armour Ind. Chem. Co.).

Examples of suitable cationics are 1-hydroxyethyl,2-oleic imidazoline sold as Monozoline O (Monae Industries, Inc.), fatty amido alkyl quaternary chloride sold as Quatrene CA (Textilana Corp.), methyl polyethonol quaternary amine sold as Peregal OK (GAF Corp.), quaternary ammonium derivative sold as Gafstat S (GAF Corp.), n-alkyl trimethylene diamines $RNH(CH_2)_3NH_2$ sold as Formonyte 801 (El Dorado Chem. Co.), primary fatty amine acetates $RNH_2.CH_3COOH$ sold as Formonyte 601AC (El Dorado Chem. Co.), fatty imidazoline-1-hydroxyethyl 2-hepta-decadienyl imidazoline sold as Fatchemco-T (Universal Chemicals Corp.), flurochemical surfactant sold as FC-134 (3M Co. Minnesota Mining & Manufacturing Co.), m(lauroyl colamine formyl metly) pyridinium chloride sold as Emcol E-607 (Witco Chem. Corp.), steryl dimethyl benzyl ammonium chloride sold as Triton X-400 (Rohm & Haas Co.), ethoxylated quaternary sold as Variquat 638 (Varney Chemicals Div.), dimethyl disteryl ammonium lanolate sold as Chemactant Q (Chemactants Inc.), amido diamine from unsaturated $C_{18}$ acids sold as Cathol (Far-Best Corp.), complex higher alkylamine composition sold as Avitex ML (C. I. DuPont), tertiary fatty amines n-alkyl dimethylanines sold as Armeen DM12 (Armour Ind.).

Examples of suitable anionics are sodium n-methyl-n-oleoyltaurate sold as Igepon T-77 (GAF Corp.), free acid of a complex organic phosphate ester sold as Gafac RS-410 (GAF Corp.), fluoroalkyl phosphate sold as Zonyl S-13 (DuPOnt), a built salt of a complex phosphate ester sold as Whit-Steem (Whitfield Chemical Co.), (octyl)$_5$Na$_5$(P$_3$O$_{10}$)$_2$ sold as Vicawet 35B (Stauffer Chemical Co.), sodium linear alkylate sulfonate sold as Ultrawet DS (Arco Chemical Co.), sulfonate mineral oil sold as Twitchell 8262 (Emery Industries, Inc.), sodium naphthalene sulfonate sold as Stablex B (Heveatex Co.), alkyl benzene sulfonate sold as Ormino (Miyoshi Oil & Fat Co., Ltd), aromatic halogenide sold as Currier 51 (Nikka Chemical Inc., Co. Ltd.), alkyl aryl sulfonate sold as Naccanol 90F (Allied Chemical Co.), sulfonated sperm oil sold as Modicol P (Nopco Chemical Div.), styrene-maleic anhydride copolymer sold as Lytron 820 (Monsanto Co.), fatty ester sulfonate LAS derivitive sold as Hypochem, EM-1 (High Point Chem. Co.), ammonium oleate sold as Eumulgin 884 (Henkel International GMBH), dioctylsulfosuccinate sold as Cinwet KCX (Cindet Chemicals, Inc.), sodium lauryl sulfate sold as Avirol 101 (Standard Chem. Products, Inc.), sodium tetrahydronaphthalene sulfonate sold as Alkanol S Flakes (DuPont), bis(tridecyl) ester of sodium sulfosuccinic acid sold as Aerosol TR-100% (American Cyanamid), phosphated mixed alcohols(avg. mol. wt. of 131) mono and diesters in acid form, sold as, Actrofus 349 (Arthur C. Trask Co.).

In addition to the melting or surface active agents, other types of conventional additives may be used in our compositions as desired, such as thickeners, sequestrants, and corrosion inhibitors.

Examples of thickeners are fused silicas such as Santocel 54 (Monsanto), Syloid 266 (Grace Chemicals) and Aerosil 380 (Degussa), magnesium aluminum slicate sold as Attagel 40 (Minerals and Chemicals Philipp) and specialty clay products such as the Bentones (National Lead Corp.).

Examples of sequestrants are sodium gluconate, ethylene diamine tetraacetic acid sodium salts, sodium tartarate, sodium oxalate and sodium citrate.

Examples of corrosion inhibitors are potassium and sodium chromates, imidazoline of oleic acid sold as Mazoline OA(Mazer Chemical), organic phosphates such as Virco Pet 30 (Arco Refining), fatty amino propyl amines (Ashland Chemical), n-alkyl trimethylenediamine sold as Formonyte 801 (El Dorado Chemical) and Alox 575, 940, 1843 and 2000 sold by the Alox Corp.

The compositions of our invention may be put together in any convenient tank equipped with agitation. The liquid high boiling oxygenated solvent is usually placed in the vessel first and then followed by the alkali metal hydroxide and the liquid high boiling amine. The order of addition is not critical except that it is important to add the solid alkali metal hydroxide to one of the liquids. Application of heat may be desirable to aid in the dissolving or dispersing of the alkali metal hydroxide. Heating and stirring are continued until solution and/or dispersion of the alkali metal hydroxide takes place. It is desirable to have an exhaust vent over the mixing tank to confine the solvent fumes.

The preferred method of removing coatings comprises applying the anhydrous composition to the coated article at a temperature ranging from ambient to boil. The preferred method of application involves immersion of the coated part, however, where in view of the size of the part this is not feasible, the material can be sprayed onto the coated surface. When dealing with epoxy-polyamides and polyurethane coatings, it is necessary to operate generally at a temperature of from 200°F. to boil. Preferably, the compositions are used at temperatures approaching their boiling points in order to achieve the greatest attack on the coating and thus to shorten the time of treatment. Since spraying a solution causes a drop in temperature, immersion of the coated article is preferred to spraying. The efficiency of the treatment is increased by using a surface active agent.

The surfaces which can be treated include glass, woods, and ferrous or non-ferrous metals. The paints or coatings which are conventionally used and to which the invention is applicable include, in addition to the above polyesters (including alkyds), polyamides, polyesyter amides alone or in conventional combinations. Primers such as iron oxides or zinc chromates can be removed by this invention as well as top coat materials listed above.

The time of application varies but in an immersion type process conditions such as temperatures and particular materials and percentages used can generally be devised to completely remove or loosen (including powdering and blistering) enough to allow a total immersion time of one minute to one hour. After this time a high pressure water wash in a single or multi-stage treatment can be applied.

DESCRIPTION OF THE PREFERRED EMBODIMENTS

The invention will be more fully understood by reference to the following non-limiting specific examples which include the best mode known to the inventors of performing the invention. In these examples a test procedure for the corrosiveness of the coating stripper is referred to as the "16 hour immersion corrosion test". This test procedure involves cleaning and wiping coated 1×2 panels in acetone and weighing them. The panels are then hung by string or plastic coated wire and suspended in a 4,000 ml beaker containing the stripping composition. The solution was agitated by magnetic stirring to keep a relatively uniform temperature throughout of 150° ± 5°C. (about 300°F.). The beaker was based on a ¼ inch sheet of asbestos and jacketed by a Glas-Col heating mantel and finally covered by a ¼ inch sheet of asbestos. A preheating time of 6 hours was used to ensure that the bath temperature could be properly maintained. The panels were immersed for 16 hours after which they were solvent cleaned, dried and again weighed. This procedure was used in order to test the corrosive influence of the composition and the composition tested as follows:

| | | |
|---|---|---|
| Triethanolamine | 44.5% | by weight |
| Triethylene glycol | 44.5% | by weight |
| Triton X-100 | 10% | by weight |
| Potassium hydroxide, flake | 1% | by weight |

EXAMPLE 1

A panel of bare aluminum (No. 2024) was weighed before the corrosion test, the weight was 2.8317 grams. After following the above-noted procedure the sample was again weighed; the result being 2.8317 grams, indicating that no weight difference was effected. The total area of the panel was 3.5288 sq.in. and the average weight change in milligrams per square inch was 0. No visual change was observed in the final appearance of the panel. A duplicate run produced the same results. The composition tested was

| Triethanolamine | 44½% |
| Triethylene Glycol | 44½% |
| Triton X-100 | 10% |
| KOH | 1% |

The following Table represents the results of testing according to Example 1 using the 16-hour immersion corrosion test described above. Each sample, except as noted, includes duplicate runs.

In the Examples the panels are designated by commerically used numbers as follows. With respect to the panels tested they comprise bare or clad panels which in the noted cases have coatings and/or primers thereon. Each metal is designated by alloy numbers conventionally used (e.g. Al. = 2024, 7075, 1100; Mg = AZ31B; Ti = 6% Al., 4% V; Steel = 1020). The coatings include chromate coats (Alodine No. 1000 and Dow No. 7) and anodized coatings.

EXAMPLE 15

A steel test panel having a surface area of approximately 4 sq.in. and having been coated with a polyurethane composition known in the art as Finch Polyurethane (Finch Chemical Coatings Company) was immersed in a solution such as described in Example 1 for 15 minutes during which the temperature of the bath ranged from 266°–302°F. At the end of the specified time the panel was removed and given a cold water pressure rinse. The treatment resulted in 100% removal of the polyurethane coating.

Table II below illustrates the results of the testing procedure of Example 15. The listed panels are aluminum unless otherwise designated having a variety of various coating compositions applied thereto.

In the Examples the primers and coatings on parts are designated by their commercial designations. The panels are sometimes provided with an initial corrosion coat (e.g. Alodine 1000 or 1200) they are sometimes provided with primers. The resins used in coating the panels are designated by the manufacturer or supplier and its number, or by the Military Specification number covering a given paint or coating type (MIL). In the designations PRC is Products Research Company;

TABLE I

| Ex. No. | Metal | Weight Before (grams) | Weight After (grams) | Weight Difference (grams) | Total Area of Panel in Sq. In. | Average Wgt. Change in mg/in$^2$ | Final Appearance |
|---|---|---|---|---|---|---|---|
| 2 | 2024 Clad Aluminum | 1) 2.9095<br>2) 2.8929 | 2.9099<br>2.8929 | 0.0004<br>0.0000 | 3.9255 | 0.051 | No visual change |
| 3 | 2024 Clad Al, Chromic Anod. | 1) 2.8789<br>2) 2.8969 | 2.8783<br>2.8953 | 0.0006<br>0.0016 | 3.9255 | 0.276 | No visual change |
| 4 | 2024 Clad Al, Alodine No. 1000 | 1) 2.7523<br>2) 2.7543 | 2.7516<br>2.7538 | 0.0007<br>0.0005 | 3.5288 | 0.170 | No visual change |
| 5 | 7075 Bare Aluminum | 1) 2.2499<br>2) 2.2736 | 2.2517<br>2.2736 | 0.0018<br>0.0000 | 3.9225 | 0.225 | No visual change |
| 6 | 7075 Clad Aluminum | 1) 2.8898<br>2) 2.8839 | 2.8899<br>2.8839 | 0.0001<br>0.0000 | 3.9255 | 0.012 | No visual change |
| 7 | 7075 Clad Al, Chromic Anod. | 1) 3.5429<br>2) 3.5492 | 3.5424<br>3.5494 | 0.0005<br>0.0002 | 3.9255 | 0.037 | No visual change |
| 8 | 7075 Clad Al, Alodine No. 1000 | 1) 3.4395<br>2) 3.4607 | 3.4394<br>3.4597 | 0.0001<br>0.0010 | 3.5288 | 0.159 | No visual change |
| 9 | Magnesium Az 31B also (QQ-M44) | 1) 1.2093<br>2) 1.2109 | 1.2085<br>1.2105 | 0.0008<br>0.0004 | 3.5288 | 0.170 | No visual change |
| 10 | Magnesium Az 31B, Dow No. 7 coating | .8370 | .8374 | 0.0004 | 3.9255 | 0.085 | No visual change |
| 11 | Titanium-6 Al, 4V Alloy also MIL-T-9046) | 7.7082 | 7.7087 | 0.0005 | 3.5288 | 0.1415 | No visual change |
| 12 | 1020 Steel | 1) 7.8844<br>2) 6.6303 | 7.8813<br>6.6272 | 0.0031<br>0.0031 | 3.5288 | 0.876 | No visual change |
| 13 | Cd. Plated 1020 Steel | 1) 6.2464<br>2) 6.3842 | 6.2413<br>6.3767 | 0.0051<br>0.0075 | 3.5288 | 1.788 | No visual change |
| 14 | 1100 Alum. | 1) 2.6816<br>2) 2.6707 | 2.6808<br>2.6694 | 0.0008<br>0.0013 | 3.5288 | 0.2975 | No visual change |

BMS is Boeing (Aircraft) Materials Specifications; Kynar is a polyvinylidine fluorine made by the Pennwalt Company, King of Prussia, Pa.

TABLE II

| Ex. No. | Paint System | Immersion Time | | Remarks |
|---|---|---|---|---|
| 16 | a) Desoto 823-011 (Desoto Paint Co.) MIL-C-27725C | 30 min. | 98% removal | - pressure rings removed additional 2%<br>- did not remove alodine coating |
| 17 | a) Epoxy Primer MIL P 27316 with b) Polyurethane top coat MIL C27227 | 30 min. | 99% removal | - remainder is readily brushed or peeled off |
| 18 | a) PRC 1560 Mil Spec. MIL-C-27725C Polyurethane | 15 min. | 100% removal | |
| 19 | a) PRC 1560m MIL-C-27725C Polyurethane | 15 min. | 100% removal | - chromate conversion coating remains |
| 20 | a) BMS-10-11 Type I (epoxy) on b) 1200 Alodine | 15 min. | 100% removal | |

TABLE II-continued

| Ex. No. | Paint System | Immersion Time | | Remarks |
|---|---|---|---|---|
| 21 | a) MIL-C-22750 Epoxy-polyamide top coat, on b) MIL-P-23377 primer epoxy-polyamide | 35 min. | 100% removal | - lifted paint off rather than dissolving or decomposing it |
| 22 | a) Boeing Epoxy-Phenolic Adhesive Primer | 15 min. | 100% removal | - after 15 min. paint was severly blistered and was removed by pressure cold $H_2O$ |
| 23 | a) Polyurethane top coat over b) modified MIL-C-22750 Epoxy primer on c) Anodized Alum. | 20 min. | 99-44/100% removal | - powdery coating remained which was easily wiped off |
| 24 | a) MIL-P-27316 on Magnesium | 7-8 min. | 100% removal | - Dow No. 7 chromate conversion coating remains with pressure rinse |
| 25 | a) Epoxy Primer b) over Clear Kynar | 8-9 min. | 99% removed | - the remainder is easily wiped off |
| 26 | a) Unbaked Super Koropon (Desoto Paint Co.) Epoxy-Polyamide top coat on b) MIL-C-22750A, Epoxy-polyamide primer | 8-9 min. | 100% removal | - some conversion coating remains. |
| 27 | a) Heat Room W-170 Al. Silicone Coating (Speco Inc.) on b) Alodine 1200 on c) 3003 Al. Alloy | 30 min. | 100% removal | |
| 28 | a) PRC-1560 mk Polyurethane coat MIL-C-27725C | 15 min. | 100% removal | |
| 29 | a) MIL-P-23377 Epoxy-Polyamide Primer 1 yr. old 1 coat | 30 min. | 100% removal | |
| 30 | MIL-P-23377 Epoxy-Polyamide Primer 1 yr. old 2 coats | 30 min. | 100% removal | |
| 31 | Zinc Chromate Primer MIL-P-8585 | 5 min. | 100% removal | |
| 32 | Desoto No. 2012 Epoxy Primer | 25 min. | 100% removal | - conversion coating remains |

EXAMPLE 33

Using the composition of Example 1 the following modifications were run wherein instead of triethylene glycol, 44.5% of the following were used a. Polyethylene glycol (avg. m.w. 300) - Carbowax 300, Union Carbide Company
b. Glycerin
c. Isodecanol
d. Tridecanol
e. Isodealdehyde
f. Tetrahydro benzaldehyde
g. Carbitol acetate
h. Glyceryl triacetate
i. Methoxy triglycol
j. Ethoxy triglycol
k. Thiodiglycol (Kromfax solution, Union Carbide Company)
l. Isophorone.

These compositions when applied to the panels of Examples 14–32 at the noted temperatures give the indicated results:

| Sample | Temperature | Results |
|---|---|---|
| a) | 302-320 | 100% removal |
| b) | " | effects some removal but solution separates |
| c) | 221-239 | 100% removal generally but only patly removes epoxy-polyamide and did not remove polyurethane |
| d) | 212-230 | 100% removal generally but only partly removes epoxy-polyamide and did not remove polyurethane |
| e) | 180-200°F | effects some removal but solution separates |
| f) | 160-180 | 100% removal generally but only partly removes epoxy-polyamide and did not remove polyurethane |
| g) | 230-248 | removes acrylic and zinc chromate only |
| h) | 266-284 | removes acrylic and zinc chromate only |
| i) | 230-257 | 100% removal |
| j) | 248-266 | 100% removal |
| k) | 302-320 | 100% removal |
| l) | | ketone reacts with alkali hydroxide to some extent but gives 100% removal |

Example 34

Various formulations of liquid high boiling solvents and liquid high boiling amines in admixture with potassium hydroxide or sodium hydroxide were tested for removal of the following coatings:

POLYURETHANE

Polyurethane fuel tank coating, specification MIL-C-27725 on alclad aluminum substrate.

EPOXY-POLYAMIDE

First coat-MIL-P-23377 epoxy primer followed by two coats of MIL-C-83286 polyurethane on anodized aluminum.

DURACRON 200

Acrylic paint system on iron phosphated steel.

SUPER KOROPON

Epoxy-polyamide primer-MIL-C-22750A followed by DeSota epoxy-polyamide top coat on 2024 alclad aluminum.

ZINC CHROMATE

Zinc chromate primer-MIL-P8585 on alclad aluminum base.

One hundred grams of each formulation were prepared and placed in a glass beaker equipped with a magnetic stirrer. Heat was applied until the formulations were at or near their boiling points. The edges of the paint and resin systems were taped with lead and placed in the formulations. The time was observed for removal or blistering of the respective coatings at the temperature indicated. Where there was no effect on the coating the time indicates the length of immersion at the temperature indicated when the observation was made. The results appear in Table III.

TABLE III

| No. | Oxygen Solvent | Amine Solvent | Alkali Metal Hydroxide | Surfactant | Time (Min.) | Temp °F | Remarks | Time (Min.) | Temp °F | Remarks |
|---|---|---|---|---|---|---|---|---|---|---|
| 1 | Ethylene Glycol 44.5 | Triethanolamine 44.5 | KOH 1.0 | Triton X-100 10.0 | 70 | 293 | Complete Removal | | | |
| 2 | Polypropylene Glycol-Dow P2000 44.5 | Triethanolamine 44.5 | KOH 1.0 | Triton X-100 10.0 | 100 | 294 | No Removal | 30 | 295 | Topcoat Removal |
| 3 | Polyethylene Glycol (Carbowax 300) 44.5 | Triethanolamine 44.5 | KOH 1.0 | Triton X-100 1.0 | 70 | 295 | No Removal | 30 | 293 | Topcoat Removal |
| 4 | Phenol 44.5 | Triethanolamine 44.5 | KOH 1.0 | Triton X-100 10.0 | 60 | 294 | No Removal | 15 | 294 | Complete Removal |
| 5 | Resorcinol 44.5 | Triethanolamine 44.5 | KOH 1.0 | Triton X-100 10.0 | 60 | 294 | No Removal | 15 | 295 | Complete Removal |
| 6 | Ethylene Glycol Monoethyl Ether 44.5 | Triethanolamine 44.5 | KOH 1.0 | Triton X-100 10.0 | 105 | 260 | No Removal | 120 | 260 | Complete Removal |
| 7 | Ethylene Glycol Monobutyl Ether 44.5 | Triethanolamine 44.5 | KOH 1.0 | Triton X-100 10.0 | 90 | 293 | No Removal | 45 | 293 | Topcoat Removal |
| 8 | Tetrahydrofurfuryl alcohol 44.5 | Triethanolamine 44.5 | KOH 1.0 | Triton X-100 10.0 | 60 | 295 | Complete Removal | | | |
| 9 | Cyclohexanol 44.5 | Triethanolamine 44.5 | KOH 1.0 | Triton X-100 10.0 | 60 | 295 | No Removal | 30 | 293 | Topcoat Removal |
| 10 | Furfuryl Alcohol 44.5 | Triethanolamine 44.5 | KOH 1.0 | Triton X-100 10.0 | 30 | 294 | No Removal | 45 | 294 | Topcoat Removal |
| 11 | 1,5-Pentanediol 44.5 | Triethanolamine 44.5 | KOH 1.0 | Triton X-100 10.0 | 90 | 293 | Complete Removal | 60 | 293 | Topcoat Removal |
| 12 | 1,2,6-Hexanetriol 44.5 | Triethanolamine 44.5 | KOH 1.0 | Triton X-100 10.0 | 120 | 295 | No Removal | 60 | 295 | Topcoat Removal |
| 13 | n-butylphthalate 44.5 | Triethanolamine 44.5 | KOH 1.0 | Triton X-100 10.0 | 60 | 302 | No Removal | 60 | 300 | No Removal |
| 14 | Diethyl Maleate 44.5 | Triethanolamine 44.5 | KOH 1.0 | Triton X-100 10.0 | 60 | 293 | No Removal | 40 | 293 | No Removal |
| 15 | Methylhexyl ketone 44.5 | Triethanolamine 44.5 | KOH 1.0 | Triton X-100 10.0 | 60 | 294 | No Removal | 30 | 294 | Complete Removal |
| 16 | Diethyl Carbitol 44.5 | Triethanolamine 44.5 | KOH 1.0 | Triton X-100 10.0 | 60 | 298 | No Removal | 90 | 293 | Topcoat Removal |
| 17 | Dibenzyl Ether 44.5 | Triethanolamine 44.5 | KOH 1.0 | Triton X-100 10.0 | 60 | 295 | No Removal | 20 | 294 | Topcoat Removal |
| 18 | Triethylene Glycol 44.5 | Dibutyl Amine 44.5 | KOH 1.0 | Triton X-100 10.0 | 60 | 298 | Topcoat Removal | 45 | 294 | Topcoat Removal |
| 19 | Triethylene Glycol 44.5 | Amine 220 ($C_{22}$ Amine) 44.5 | KOH 1.0 | Triton X-100 10.0 | 80 | 293 | No Removal | 60 | 293 | Topcoat Removal |
| 20 | Triethylene Glycol 44.5 | Dimethyl Aniline 44.5 | KOH 1.0 | Triton X-100 10.0 | 15 | 296 | Complete Removal | | | |
| 21 | Triethylene Glycol 44.5 | Quinoline 44.5 | KOH 1.0 | Triton X-100 10.0 | 30 | 294 | Complete Removal | | | |
| 22 | Triethylene Glycol 44.5 | 4-Ethyl Morpholine 44.5 | KOH 1.0 | Triton X-100 10.0 | 60 | 293 | 90% Coating Removal | 35 | 296 | Topcoat Removal |
| 23 | Triethylene Glycol 44.5 | Triethylene tetramine 44.5 | KOH 1.0 | Tritn X-100 10.0 | 20 | 298 | Complete Removal | | | |
| 24 | Triethylene Glycol 44.5 | N-aminopropyl Morpholine 44.5 | KOH 1.0 | Tritn X-100 10.0 | 70 | 295 | 95% Coating Removal | | | |
| 25 | Triethylene Glycol 44.5 | Hydroxyethyl Piperazene 44.5 | KOH 1.0 | Triton X-100 10.0 | 30 | 293 | Complete Removal | | | |
| 26 | Triethylene Glycol 44.5 | Tetrakis-(2 propanol) Ethylene Diamide 44.5 | KOH 1.0 | Triton X-100 10.0 | 60 | 298 | Complete Removal | 60 | 298 | Topcoat Removal |

TABLE III-continued

| | Formulation - (Percent by Weight) | | | | Polyurethane Coating | | | Epoxy-Polyamide Coating | | |
|---|---|---|---|---|---|---|---|---|---|---|
| No. | Oxygen Solvent | Amine Solvent | Alkali Metal Hydroxide | Surfactant | Time (Min.) | Temp °F | Remarks | Time (Min.) | Temp °F | Remarks |
| 27 | Triethylene Glycol 44.5 | Benzyl Diethyl Amine 44.5 | KOH 1.0 | Triton X-100 10.0 | 60 | 298 | Complete Removal | 45 | 293 | Topcoat Removal |
| 28 | Triethylene Glycol 44.5 | Monoethanol-amine 44.5 | KOH 1.0 | Triton X-100 10.0 | 20 | 293 | Complete Removal | | | |
| 29 | Triethylene Glycol 44.5 | N-vinyl-2-pyrrolidone 44.5 | KOH 1.0 | Triton X-100 10.0 | 20 | 294 | Complete Removal | | | |
| 30 | Triethylene Glycol 44.5 | m-pyrol 44.5 | KOH 1.0 | Triton X-100 10.0 | 45 | 284 | No Removal | 15 | 295 | Complete Removal |
| 31 | Triethylene Glycol 44.5 | Dimethyl Formamide 44.5 | KOH 1.0 | Triton X-100 10.0 | 70 | 293 | No Removal | 20 | 293 | Complete Removal |
| 32 | Triethylene Glycol 44.5 | Lauric Diethanol-amide 44.5 | KOH 1.0 | Triton X-100 10.0 | 60 | 294 | No Removal | 37 | 295 | No Removal |
| 33 | 4-butyl lactone 44.5 | Triethanolamine 44.5 | KOH 1.0 | Triton X-100 10.0 | 60 | 295 | No Removal | 15 | 294 | Complete Removal |
| 34 | Dimethyl sulfoxide 44.5 | triethanolamine 44.5 | KOH 1.0 | Triton X-100 10.0 | 30 | 293 | Complete Removal | 40 | 200 | No Removal |
| 35 | Tetramethyl urea 44.5 | Triethanolamine 44.5 | KOH 1.0 | Triton X-100 10.0 | 90 | 293 | Complete Removal | 40 | 294 | Complete Removal |
| 36 | Tetrahydro furfuryl alcohol 44.5 | Dipropylamine 44.5 | KOH 1.0 | Triton X-100 10.0 | | | | 30 | 246 | Topcoat Removal |
| 37 | Triethylene Glycol 44.5 | N,N-Dimethyl Acetamide 44.5 | KOH 1.0 | Triton X-100 10.0 | 120 | 295 | Complete Removal | 20 | 295 | Complete Removal |
| 38 | n-butylphtha-late 44.5 | Triethanolamine 44.5 | KOH 1.0 | Triton X-100 10.0 | | | | | | |
| 39 | Diethyl Maleate 44.5 | Triethanolamine 44.5 | KOH 1.0 | Triton X-100 10.0 | | | | | | |
| 40 | 4-methoxy-4-methyl-2-pentanone 44.5 | Triethanolamine 44.5 | KOH 1.0 | Triton X-100 10.0 | 45 | 255 | No Removal | 30 | 255 | Topcoat Removal |
| 41 | Decyl Alcohol 44.5 | Triethanolamine 44.5 | KOH 1.0 | Triton X-100 1.0 | 45 | 297 | No Removal | 30 | 297 | Complete Removal |
| 42 | Tetrahydro-furfuryl Alcohol 49.0 | Triethanolamine 49.0 | KOH 1.0 | Cetyl Dimethyl amine oxide (Ammonox Co) 1.0 | 50 | 299 | Complete Removal | | | |
| 43 | Tetrahydro-furfuryl Alcohol 40.0 | Triethanolamine 40.0 | KOH 0.25 | Cetyl Dimethyl-amine oxide (Ammonox Co) 19.75 | 23 | 294 | No Removal | 15 | 294 | Complete |
| 44 | Triethylene Glycol 49.0 | Triethanolamine 49.0 | KOH 1.0 | 1-Hydroxy-ethyl, 2-oleic-imidazoline (Monozoline Co) 1.0 | 45 | 299 | 90% Removal | 35 | 299 | Topcoat |
| 45 | Tetrahydro-furfuryl Alcohol 40.0 | Triethanolamine 41.0 | KOH 1.0 | 1-Hydroxyethyl-2-oleic-imidazoline 18.0 (Ammonox CO) | 45 | 299 | 75% Removal | 30 | 297 | 93% Removal |
| 46 | Triethylene 49.0 | Monoethanol-amine 49.0 | KOH 1.0 | Fatty amido alkyl quaternary chloride 1.0 (Quantrene CA) | 5 | 297 | Complete Removal | | | |
| 47 | Triethylene Glycol 41.0 | Monoethanol-amine 40.0 | KOH 1.0 | Fatty amido alkyl quaternary chloride 18.0 (Quantrene CA) | 15 | 298 | No Removal | 8 | 298 | Complete Removal |
| 48 | Triethylene Glycol 40.0 | Triethanolamine 59.75 | KOH 0.25 | | 60 | 301 | No Removal | 30 | 301 | Topcoat Removal |
| 49 | Tetrahydro-furfuryl Alcohol 40.0 | Triethanolamine 59.75 | KOH .25 | | 60 | 300 | 98% Removal | 20 | 300 | Complete Removal |
| 50 | Triethylene Glycol 59.75 | Triethanolamine 40.0 | KOH 0.25 | | 30 | 300 | No Removal | 30 | 300 | Topcoat Removal |
| 51 | Tetrahydro-furfuryl Alcohol 59.75 | Triethanolamine 40.0 | KOH 0.25 | | 30 | 300 | No Removal | 8 | 300 | Complete Removal |
| 52 | Triethylene Glycol 40.0 | Triethanolamine 58.75 | KOH 0.25 | Sodium N-methyl oleoyl taurate (Igepon T77) 1.0 | 60 | 300 | No Removal | 35 | 300 | Topcoat Removal |
| 53 | Triethylene Glycol 58.75 | Triethanolamine 40.0 | KOH 0.25 | Sodium N-methyl oleoyl taurate (Igepon T77) 1.0 | 50 | 297 | No Removal | 45 | 297 | Topcoat Removal |
| 54 | Tetrahydro-furfuryl Alcohol 40.0 | Triethanolamine 41.0 | KOH 1.0 | Organic phos-phate ester (Gafac RS 410) 18.0 | 60 | 298 | No Removal | 10 | 298 | Complete Removal |
| 55 | Triethylene | Triethanolamine | KOH | Organic phos- | 60 | 295 | No | 40 | 298 | Topcoat |

TABLE III-continued

| No. | Oxygen Solvent | Amine Solvent | Alkali Metal Hydroxide | Surfactant | Polyurethane Coating Time (Min.) | Temp °F | Remarks | Epoxy-Polyamide Coating Time (Min.) | Temp °F | Remarks |
|---|---|---|---|---|---|---|---|---|---|---|
|  | Glycol 40.0 | 41.0 | 1.0 | phate ester (Gafac RS 410) 18.0 |  |  | Removal |  |  | Removal |
| 56 | Isoamyl Alcohol 44.5 | Triethanolamine 44.5 | KOH 0.25 | Triton X-100 10.0 | 110 | 284 | No Removal | 30 | 284 | Topcoat Removal |
| 57 | N-butyl Alcohol 44.5 | Triethanolamine 44.5 | KOH 1.0 | Triton X-100 10.0 |  |  |  | 30 | 216 | Topcoat Removal |
| 58 | Di-phenyl ether 44.5 | mono-ethanol-amine 44.5 | KOH 1.0 | Triton X-100 10.0 | 5 | 298 | Complete Removal |  |  |  |
| 59 | Dimethyl formamide 44.5 | Triethanolamine 44.5 | KOH 1.0 | Triton X-100 10.0 | 45 | 295 | No Removal | 10 | 296 | Complete Removal |
| 60 | N,N-Dimethyl Acetamide 44.5 | Monoethanol-amine 44.5 | KOH 1.0 | Triton X-100 10.0 | 15 | 298 | Complete Removal |  |  |  |
| 61 | Triethylene Glycol 40.0 | Triethanolamine 59.75 | KOH 0.25 |  |  |  |  |  |  |  |
| 62 | Triethylene Glycol 40.0 | Triethanolamine 41.0 | KOH 1 | Organic phos-phate ester (Gafac 610) 18.0 |  |  |  |  |  |  |
| 63 | Triethylene Glycol 40.0 | Triethanolamine 41.0 | KOH 0.25 | Dodecyl ben-zene sulfonate (Nacconol 90F) 18.0 |  |  |  |  |  |  |
| 64 | Diphenyl Ether 22.25 Tetrahydro furfuryl Alcohol 22.25 | Triethanolamine 44.5 | NaOH 1.0 | Triton X-100 10 | 50 | 297 | Complete Removal |  |  |  |
| 65 | Triethylene Glycol 44.5 | Triethylene tetramine 22.25 Hydroxyethyl piperazine 22.25 | NaOH 1.0 | Triton X-100 | 15 | 301 | Complete Removal |  |  |  |

TABLE III (extended)

| Test No. | Duracron 200 Coating Time (Min.) | Temp °F | Results | Super Koropon Coating Time (Min.) | Temp. °F | Results | Zinc Chromate Coating Time (Min.) | Temp. °F | Results |
|---|---|---|---|---|---|---|---|---|---|
| 1 |  |  |  |  |  |  |  |  |  |
| 2 |  |  |  | 55 | 294 | Complete Removal |  |  |  |
| 3 | 15 | 294 | No Removal |  |  |  |  |  |  |
| 4 |  |  |  |  |  |  |  |  |  |
| 5 |  |  |  |  |  |  |  |  |  |
| 6 |  |  |  |  |  |  |  |  |  |
| 7 | 5 | 293 | Complete Removal | 5 | 213 | Complete Removal |  |  |  |
| 8 |  |  |  |  |  |  |  |  |  |
| 9 | 10 | 293 | Complete Removal |  |  |  |  |  |  |
| 10 | 10 | 295 | Complete Removal | 5 | 294 | Complete Removal |  |  |  |
| 11 |  |  |  |  |  |  |  |  |  |
| 12 | 15 | 294 | Complete Removal |  |  |  |  |  |  |
| 13 | 60 | 300 | Topcoat Removed |  |  |  |  |  |  |
| 14 | 45 | 293 | No Removal | 30 | 293 | No Removal | 12 | 300 | Complete Removal |
| 15 | 5 | 294 | Complete Removal | 8 | 294 | Complete Removal |  |  |  |
| 16 | 25 | 294 | No Removal | 60 | 293 | Topcoat Removal |  |  |  |
| 17 | 15 | 294 | Complete Removal | 10 | 294 | Complete Removal |  |  |  |
| 18 | 15 | 293 | Complete Removal |  |  |  |  |  |  |
| 19 | 40 | 294 | Complete Removal |  |  |  |  |  |  |
| 20 |  |  |  |  |  |  |  |  |  |
| 21 |  |  |  |  |  |  |  |  |  |
| 22 |  |  |  |  |  |  |  |  |  |
| 23 |  |  |  |  |  |  |  |  |  |
| 24 |  |  |  |  |  |  |  |  |  |
| 25 |  |  |  |  |  |  |  |  |  |
| 26 | 1 |  |  | 15 | 298 | Complete Removal |  |  |  |
| 27 |  |  |  | 30 | 293 | Complete Removal |  |  |  |
| 28 |  |  |  |  |  |  |  |  |  |
| 29 | 10 | 294 | Complete Removal |  |  |  |  |  |  |
| 30 | 20 | 294 | Complete |  |  |  |  |  |  |

TABLE III-continued

| | Formulation - (Percent by Weight) | | | | Polyurethane Coating | | | Epoxy-Polyamide Coating | | |
|---|---|---|---|---|---|---|---|---|---|---|
| No. | Oxygen Solvent | Amine Solvent | Alkali Metal Hydroxide | Surfactant | Time (Min.) | Temp °F | Remarks | Time (Min.) | Temp °F | Remarks |
| 31 | 60 | | | | | 293 | Removal / No Removal | 5 | 293 | Complete Removal |
| 32 | 60 | | | | 20 | 294 | Complete Removal | | 294 | Complete Removal |
| 33 | 45 | | | | | 294 | No Removal | | | |
| 34 | | | | | | | | | | |
| 35 | 5 | | | | | 295 | Complete Removal | | | |
| 36 | | | | | 30 | 246 | Complete Removal | | | |
| 37 | | | | | 15 | 295 | Complete Removal | | | |
| 38 | | | | | 2 | 300 | Complete Removal | | | |
| 39 | | | | | 12 | 300 | Complete Removal | | | |
| 40 | | | | | 20 | 257 | Complete Removal | | | |
| 41 | | | | | | | | | | |
| 42 | | | | | | | | | | |
| 43 | | | | | | | | | | |
| 44 | | | | | 20 | 298 | Complete Removal | | | |
| 45 | | | | | | | | | | |
| 46 | | | | | | | | | | |
| 47 | | | | | | | | | | |
| 48 | | | | | 30 | 301 | 75% of Topcoat Removal | | | |
| 49 | | | | | | | | | | |
| 50 | | | | | 45 | 300 | Complete Removal | | | |
| 51 | | | | | | | | | | |
| 52 | | | | | 20 | 300 | Complete Removal | | | |
| 53 | | | | | 15 | 298 | Complete Removal | | | |
| 54 | | | | | | | | | | |
| 55 | | | | | 35 | 294 | Topcoat Removal | | | |
| 56 | | | | | 5 | 284 | Complete Removal | | | |
| 57 | | | | | 15 | 216 | Complete Removal | | | |
| 58 | | | | | | | | | | |
| 59 | | | | | | | | | | |
| 60 | | | | | | | | | | |
| 61 | | | | | | | | 1 | 293 | Complete Removal |
| 62 | | | | | 45 | 297 | No Removal | 2 | 297 | Complete Removal |
| 63 | | | | | 20 | 284 | Complete Removal | 2 | 295 | Complete Removal |
| 64 | | | | | | | | | | |
| 65 | | | | | | | | | | |

We claim:

1. The metal coating removal composition comprising an anhydrous liquid mixture of one-fourth to about 10% by weight of alkali metal hydroxide, from 40 to about 60% by weight of at least one oxygenated organic solvent liquid at ambient temperatures and having a boiling point in excess of about 100°C . selected from the group consisting of alcohols, carbonyls, esters, amides, lactones, tetramethyl urea, diphenyl ether and dimethyl sulfoxide and from 40 to about 60% by weight of at least one amine liquid at ambient temperatures and having a boiling point above about 65°C.

2. The metal coating removal composition of claim 1 in which the liquid high boiling oxygenated organic solvent is an alcohol.

3. The metal coating removal composition of claim 1 in which the liquid high boiling oxygenated organic solvent is a carbonyl.

4. The metal coating removal composition of claim 1 in which the liquid high boiling oxygenated organic solvent is an ester.

5. The metal coating removal composition of claim 1 in which the liquid high boiling oxygenated organic solvent is an amide.

6. The metal coating removal composition of claim 1 in which the liquid high boiling oxygenated solvent is a lactone.

7. The metal coating removal composition of claim 1 in which the liquid high boiling oxygenated organic solvent is tetramethyl urea.

8. The metal coating removal composition of claim 1 in which the liquid high boiling oxygenated organic solvent is diphenyl ether.

9. The metal coating removal composition of claim 1 in which the liquid high boiling oxygenated organic solvent is dimethyl sulfoxide.

10. The composition of claim 1 to which there is added from one-half to about 20% by weight of a surface active agent.

11. The process for removing coatings from metal by applying to the coated metal an anhydrous liquid mixture comprising one-fourth to about 10% by weight of alkali metal hydroxide, from 40 to 60% by weight of at least one oxygenated organic solvent liquid at ambient temperatures and having a boiling point in excess of about 100°C. selected from the group consisting of alcohols, carbonyls, esters, amides, lactones, tetramethyl urea, diphenyl ether and dimethyl sulfoxide and from 40 to about 60% by weight of at least one amine liquid at ambient temperatures and having a boiling point above about 65°C., for a time sufficient to loosen the said coatings and thereafter rinsing the metal to remove the loosened coatings.

12. The process of claim 11 in which the liquid high boiling oxygenated organic solvent is an alcohol.

13. The process of claim 11 in which the liquid high boiling oxygenated organic solvent is a carbonyl.

14. The process of claim 11 in which the liquid high boiling oxygenated organic solvent is an ester.

15. The process of claim 11 in which the liquid high boiling oxygenated organic solent is an amide.

16. The process of claim 11 in which the liquid high boiling oxygenated organic solvent is a lactone.

17. The process of claim 11 in which the liquid high boiling oxygenated organic solvent is tetramethyl urea.

18. The process of claim 11 in which the liquid high boiling oxygenated organic solvent is diphenyl ether.

19. The process of claim 11 in which the liquid high boiling oxygenated organic solvent is dimethyl sulfoxide.

20. The process of claim 11 to which there is added to the anhydrous liquid mixture from one-half to about 20% by weight of a surface active agent.

* * * * *

UNITED STATES PATENT OFFICE
CERTIFICATE OF CORRECTION

Patent No. 3,954,648  Dated May 4, 1976

Inventor(s) Edward John Belcak and Leo Francis Corcoran

It is certified that error appears in the above-identified patent and that said Letters Patent are hereby corrected as shown below:

Table III, No. 2, under column Time,--100-- should read "110".

Table III, No. 3, Triton X-100 1.0 should read "Triton X-100 10.0".

Table III, No. 41, Triton X-100 1.0 should read "Triton X-100 10.0".

Table III, No. 43, Complete should read "Complete Removal".

Table III, No. 44, Topcoat should read "Topcoat Removal".

Table III, No. 49, KOH .25 should "KOH 0.25".

Claim 6, before solvent should be added "organic".

Claim 15, the word solent should read "solvent".

Signed and Sealed this

Twenty-seventh Day of July 1976

[SEAL]

Attest:

RUTH C. MASON
Attesting Officer

C. MARSHALL DANN
Commissioner of Patents and Trademarks